US009517600B2

(12) United States Patent
O'Hagan et al.

(10) Patent No.: US 9,517,600 B2
(45) Date of Patent: Dec. 13, 2016

(54) METHOD FOR FORMING A CONTAINER HAVING AN INJECTION-MOLDED FEATURE

(71) Applicant: Graphic Packaging International, Inc., Atlanta, GA (US)

(72) Inventors: Brian R. O'Hagan, Appleton, WI (US); Philip E. Netzer, Greenville, WI (US); Bruce Barnard, Brillion, WI (US); Peter W. Blaas, Marion, WI (US); Kevin J. Hjort, Clintonville, WI (US)

(73) Assignee: Graphic Packaging International, Inc., Atlanta, GA (US)

( * ) Notice: Subject to any disclaimer, the term of this patent is extended or adjusted under 35 U.S.C. 154(b) by 691 days.

(21) Appl. No.: 13/896,796

(22) Filed: May 17, 2013

(65) Prior Publication Data

US 2013/0249142 A1    Sep. 26, 2013

Related U.S. Application Data

(60) Division of application No. 12/822,591, filed on Jun. 24, 2010, now Pat. No. 8,464,894, which is a
(Continued)

(51) Int. Cl.
*B29C 45/14*    (2006.01)
*B29D 22/00*    (2006.01)
(Continued)

(52) U.S. Cl.
CPC ......... *B29D 22/003* (2013.01); *B29C 45/0046* (2013.01); *B29C 45/14475* (2013.01); *B65D 5/209* (2013.01); *B29L 2031/712* (2013.01)

(58) Field of Classification Search
None
See application file for complete search history.

(56) References Cited

U.S. PATENT DOCUMENTS 2,328,563 A    9/1943 Lichter
2,522,397 A    9/1950 Palmer
(Continued)

FOREIGN PATENT DOCUMENTS

EP    0 082 209 A2    6/1983
EP    0 156 000 A2    10/1985
(Continued)

OTHER PUBLICATIONS

Supplementary European Search Report for EP 08 87 0276 dated Aug. 29, 2013.
(Continued)

*Primary Examiner* — Edmund Lee
(74) *Attorney, Agent, or Firm* — Womble Carlyle Sandridge & Rice, LLP

(57) ABSTRACT

A structure is injection molded onto a group of panels to form a container. The container has a tray and an injection-molded feature. The tray has a plurality of side panels that extend at least partially around, and at least partially define, a cavity of the container. The tray has a plurality of multi-part flanges with at least one of the multi-part flanges including a lower flange portion and an upper flange portion. The injection-molded feature has band that is injected molded onto the lower flange portion and the upper flange portion. An injection-molded strip extends along and at least partially defines the corner of the container. The strip extends downward from the inner portion of the band in the elongate corner of the container. A tool is also disclosed for forming the container.

7 Claims, 15 Drawing Sheets

Related U.S. Application Data continuation of application No. PCT/US2008/088408, filed on Dec. 29, 2008.

(60) Provisional application No. 61/017,348, filed on Dec. 28, 2007.

(51) Int. Cl.
  *B29C 45/00* (2006.01)
  *B65D 5/20* (2006.01)
  *B29L 31/00* (2006.01)

(56) References Cited

U.S. PATENT DOCUMENTS

| | | |
|---|---|---|
| 2,607,080 A | 8/1952 | Stewart |
| 2,634,880 A | 4/1953 | Gravatt |
| 3,040,949 A | 6/1962 | Foote |
| 3,099,377 A | 7/1963 | Metzler et al. |
| 3,119,540 A * | 1/1964 | Schenk ............... A61F 2/06 229/114 |
| 3,135,455 A * | 6/1964 | Santangelo ....... B29C 45/14475 206/438 |
| 3,144,167 A | 8/1964 | Robert |
| 3,154,617 A * | 10/1964 | Schenk ............ B29C 45/14475 264/266 |
| 3,190,530 A | 6/1965 | Edwards |
| 3,226,008 A | 12/1965 | Bartolomeo |
| 3,286,876 A | 11/1966 | Ring |
| 3,342,915 A | 9/1967 | Wanderer |
| 3,511,902 A | 5/1970 | Santangelo |
| 3,561,902 A * | 2/1971 | Best ..................... F23D 14/145 431/328 |
| 3,680,733 A | 8/1972 | Winslow |
| 3,684,633 A | 8/1972 | Haase |
| 3,765,976 A | 10/1973 | Nasica |
| 3,785,544 A | 1/1974 | Smith |
| 3,834,606 A | 9/1974 | Andersson |
| 3,967,731 A | 7/1976 | Boduch |
| 3,973,689 A | 8/1976 | Sutch |
| 4,001,471 A | 1/1977 | Rumball |
| 4,079,851 A | 3/1978 | Valyi |
| 4,123,214 A | 10/1978 | Sutch |
| 4,139,115 A | 2/1979 | Robinson |
| 4,149,838 A | 4/1979 | Sutch |
| 4,183,435 A | 1/1980 | Thompson et al. |
| 4,312,451 A | 1/1982 | Forbes, Jr. |
| 4,404,162 A | 9/1983 | Miki et al. |
| 4,489,120 A | 12/1984 | Hollinger, Jr. |
| 4,533,065 A | 8/1985 | Chazal et al. |
| 4,533,312 A | 8/1985 | Von Holdt |
| 4,606,496 A | 8/1986 | Marx et al. |
| 4,609,140 A | 9/1986 | Van Handel et al. |
| 4,624,380 A | 11/1986 | Wernette |
| 4,704,510 A | 11/1987 | Matsui |
| 4,721,499 A | 1/1988 | Marx et al. |
| 4,775,771 A | 10/1988 | Pawlowski et al. |
| 4,865,921 A | 9/1989 | Hollenberg et al. |
| 4,890,439 A | 1/1990 | Smart et al. |
| 4,935,089 A | 6/1990 | Schirmer |
| 4,936,935 A | 6/1990 | Beckett |
| 4,963,424 A | 10/1990 | Beckett |
| 4,971,201 A | 11/1990 | Sathre |
| 5,039,364 A | 8/1991 | Beckett et al. |
| 5,117,078 A | 5/1992 | Beckett |
| 5,183,706 A | 2/1993 | Bekele |
| 5,190,209 A | 3/1993 | Gordon et al. |
| 5,213,902 A | 5/1993 | Beckett |
| 5,219,461 A | 6/1993 | Hyll et al. |
| 5,221,419 A | 6/1993 | Beckett |
| 5,260,537 A | 11/1993 | Beckett |
| 5,266,386 A | 11/1993 | Beckett |
| 5,269,717 A | 12/1993 | Tardif |
| RE34,683 E | 8/1994 | Maynard et al. |
| 5,335,847 A | 8/1994 | Lisiecki |
| 5,340,436 A | 8/1994 | Beckett |
| 5,354,973 A | 10/1994 | Beckett |
| 5,410,135 A | 4/1995 | Pollart et al. |
| 5,424,517 A | 6/1995 | Habeger, Jr. et al. |
| 5,506,036 A | 4/1996 | Bergerious |
| 5,519,195 A | 5/1996 | Keefer et al. |
| 5,565,228 A | 10/1996 | Gics |
| 5,628,921 A | 5/1997 | Beckett |
| 5,672,407 A | 9/1997 | Beckett |
| 5,676,276 A | 10/1997 | Zielinski |
| 5,758,773 A | 6/1998 | Clements |
| 5,759,422 A | 6/1998 | Schmelzer et al. |
| 5,800,724 A | 9/1998 | Habeger et al. |
| 5,934,472 A | 8/1999 | Ramirez et al. |
| 6,114,679 A | 9/2000 | Lai et al. |
| 6,149,006 A | 11/2000 | Brauner et al. |
| 6,150,646 A | 11/2000 | Lai et al. |
| 6,204,492 B1 | 3/2001 | Zeng et al. |
| 6,251,451 B1 | 6/2001 | Zeng |
| 6,308,831 B1 | 10/2001 | Saxe et al. |
| 6,414,290 B1 | 7/2002 | Cole et al. |
| 6,433,322 B2 | 8/2002 | Zeng et al. |
| 6,455,827 B2 | 9/2002 | Zeng |
| 6,547,127 B2 | 4/2003 | Bradford et al. |
| 6,552,315 B2 | 4/2003 | Zeng et al. |
| 6,667,004 B2 | 12/2003 | Cha |
| 6,677,563 B2 | 1/2004 | Lai |
| 6,682,675 B1 | 1/2004 | Vandangeot et al. |
| 6,682,676 B1 | 1/2004 | Renault et al. |
| 6,717,121 B2 | 4/2004 | Zeng et al. |
| 6,765,182 B2 | 7/2004 | Cole et al. |
| 6,790,026 B2 | 9/2004 | Vandangeot et al. |
| 6,823,624 B2 | 11/2004 | Proserpio |
| 6,981,863 B2 | 1/2006 | Renault et al. |
| 6,988,654 B2 | 1/2006 | Wnek |
| 7,000,825 B2 | 2/2006 | Alexander et al. |
| 7,019,271 B2 | 3/2006 | Wnek et al. |
| 7,311,868 B2 | 12/2007 | Ek |
| 7,323,669 B2 | 1/2008 | Robison et al. |
| 7,351,942 B2 | 4/2008 | Wnek et al. |
| 7,365,292 B2 | 4/2008 | Cole et al. |
| 7,476,830 B2 | 1/2009 | Middleton et al. |
| 7,541,562 B2 | 6/2009 | Cole et al. |
| 8,124,201 B2 * | 2/2012 | O'Hagan ............. B29C 51/082 220/62 |
| 8,252,217 B2 | 8/2012 | Wnek et al. |
| 8,464,894 B2 | 6/2013 | O'Hagan et al. |
| 8,784,959 B2 * | 7/2014 | O'Hagan ............. B29C 51/082 220/62 |
| 2001/0004003 A1 | 6/2001 | Watanabe et al. |
| 2002/0092791 A1 | 7/2002 | Wnek |
| 2003/0014912 A1 | 1/2003 | Proserpio |
| 2004/0239005 A1 | 12/2004 | Ek |
| 2004/0262322 A1 * | 12/2004 | Middleton ........ B29C 45/14336 220/675 |
| 2005/0109653 A1 | 5/2005 | Wnek et al. |
| 2006/0198972 A1 | 9/2006 | Ueda et al. |
| 2007/0081743 A1 | 4/2007 | Kim |
| 2007/0194029 A1 | 8/2007 | Middleton et al. |
| 2007/0251943 A1 | 11/2007 | Wnek et al. |
| 2007/0262487 A1 | 11/2007 | O'Hagan |
| 2007/0267374 A1 | 11/2007 | Middleton et al. |
| 2008/0000896 A1 | 1/2008 | Lafferty et al. |
| 2008/0073339 A1 | 3/2008 | Lamarche |
| 2008/0164178 A1 | 7/2008 | Wnek et al. |
| 2009/0223952 A1 | 9/2009 | Wnek et al. |
| 2009/0250372 A1 | 10/2009 | Wnek et al. |

FOREIGN PATENT DOCUMENTS

| | | |
|---|---|---|
| EP | 0 816 239 A1 | 1/1998 |
| EP | 0 844 972 B1 | 7/2002 |
| EP | 1 332 972 A2 | 8/2003 |
| FR | 1 006 970 | 4/1952 |
| FR | 1 288 503 | 3/1962 |
| FR | 2 677 915 | 12/1992 |
| FR | 2 733 715 A1 | 11/1996 |
| FR | 2 806 346 A1 | 9/2001 |
| FR | 2 806 347 A1 | 9/2001 |

(56) References Cited

FOREIGN PATENT DOCUMENTS

| | | |
|---|---|---|
| GB | 1 348 370 | 3/1974 |
| GB | 1 487 825 | 10/1977 |
| GB | 1 502 266 | 3/1978 |
| GB | 2 171 048 A | 8/1986 |
| GB | 2 229 133 A | 9/1990 |
| JP | 47-23456 | 10/1972 |
| JP | 538574 | 3/1978 |
| JP | 54-116059 | 9/1979 |
| JP | 54-126887 | 9/1979 |
| JP | 56-65866 U | 6/1981 |
| JP | 59-75004 | 4/1984 |
| JP | 60-96234 | 7/1985 |
| JP | 03-004582 | 1/1991 |
| JP | 30-57020 U | 5/1991 |
| JP | 60-00843 A | 1/1994 |
| JP | 07-28833 | 5/1995 |
| JP | 08119271 | 5/1996 |
| JP | 08-156944 | 6/1996 |
| JP | 08-282647 | 10/1996 |
| JP | 08-337235 | 12/1996 |
| JP | 09-254948 | 9/1997 |
| JP | 2000-043840 | 2/2000 |
| JP | 2000-142825 | 5/2000 |
| JP | 2000-238760 | 9/2000 |
| JP | 2000-335550 | 12/2000 |
| JP | 2001-213420 | 8/2001 |
| JP | 2001-328617 | 11/2001 |
| JP | 2006-513108 | 4/2006 |
| JP | 2007-111888 A | 5/2007 |
| KR | 19990023720 | 7/1999 |
| KR | 100360299 B1 | 7/2000 |
| WO | WO 94/01276 | 1/1994 |
| WO | WO 94/08777 | 4/1994 |
| WO | WO 03/066435 A2 | 8/2003 |
| WO | WO 03/078012 A1 | 9/2003 |
| WO | WO 2004/033324 A1 | 4/2004 |
| WO | WO 2007/106367 A2 | 9/2007 |
| WO | WO 2008/049048 A2 | 4/2008 |
| WO | WO 2009/086501 A2 | 7/2009 |
| WO | WO 2009/088904 A2 | 7/2009 |

OTHER PUBLICATIONS

International Search Report and Written Opinion, PCT/US2008/088408, mailed Aug. 14, 2009.
Supplementary European Search Report for EP 03 77 6279 dated Jan. 21, 2009.
International Search Report and Written Opinion for PCT/US2007/005956 dated Jan. 3, 2010.
International Search Report and Written Opinion for PCT/US2009/035986 dated Jan. 25, 2010.
Second Supplementary European Search Report for EP 03 77 6279 dated Jan. 28, 2009.
International Search Report and Written Opinion for PCT/US2008/008605 mailed Jul. 27, 2009.
Notification of Reason for Refusal for Japanese Patent Application No. 2010-540948 dated Jan. 30, 2012, with English translation.
Supplementary European Search Report for EP 08 86 8990 dated Jan. 25, 2012.
Supplementary European Search Report for EP 09 75 5313 dated Jan. 25, 2012.
Communication from EPO for EP 07 752 640.8 dated Mar. 1, 2010.
Notice of Reason for Rejection for JP 2009-500389 dated Jul. 4, 2011 and English translation.
Office Action for U.S. Appl. No. 12/822,591 dated Dec. 19, 2011.
Response to Restriction Requirement for U.S. Appl. No. 12/822,591 dated Jan. 5, 2012.
Office Action for U.S. Appl. No. 12/822,591 dated May 15, 2012.
Amendment A and Response to Office Action for U.S. Appl. No. 12/822,591 dated Aug. 15, 2012.
Office Action for U.S. Appl. No. 12/822,591 dated Nov. 6, 2012.
Amendment B and Response to Final Office Action for U.S. Appl. No. 12/822,591 dated Dec. 26, 2012.
Notice of Allowance and Fee(s) Due for U.S. Appl. No. 12/822,591 dated Mar. 7, 2013.
Part B—Fee(s) Transmittal for U.S. Appl. No. 12/822,591 dated May 20, 2013.
Issue Notification for U.S. Appl. No. 12/822,591 dated May 29, 2013.

* cited by examiner

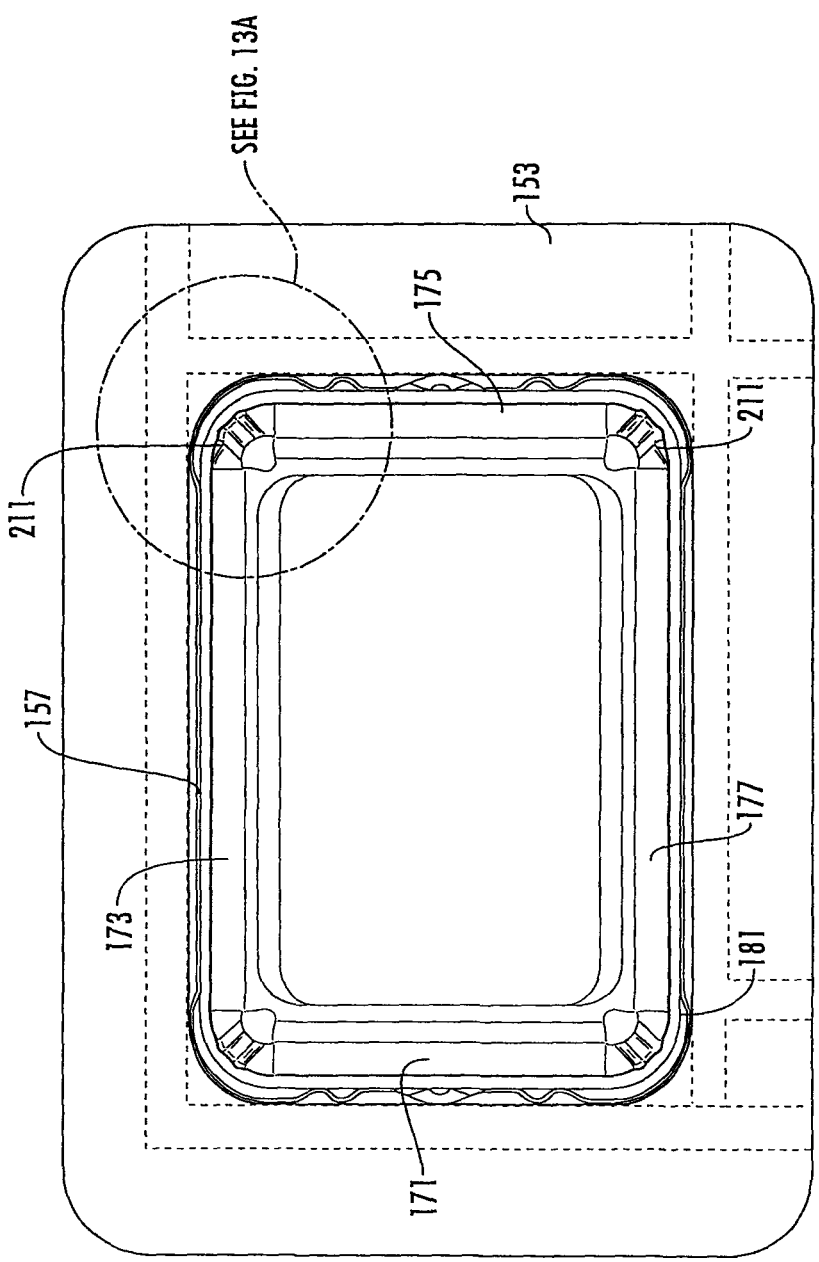

METHOD FOR FORMING A CONTAINER HAVING AN INJECTION-MOLDED FEATURE

CROSS-REFERENCE TO RELATED APPLICATION

This application is a divisional of U.S. patent application Ser. No. 12/822,591, filed Jun. 24, 2010, now U.S. Pat. No. 8,464,894, which application is a continuation application of prior PCT Application No. PCT/US2008/88408, filed Dec. 29, 2008, entitled "Injection-Molded Construct and tool for Forming Construct," which PCT application claims the benefit of U.S. Provisional Application No. 61/017,348, filed on Dec. 28, 2007.

INCORPORATION BY REFERENCE

The entire disclosures of U.S. patent application Ser. No. 12/822,591, filed Jun. 24, 2010, PCT Application No. PCT/US2008/88408, filed Dec. 29, 2008, and U.S. Provisional Application No. 61/917,348, filed Dec. 28, 2007, are incorporated by reference as if set forth in their entireties.

BACKGROUND OF THE DISCLOSURE

The present disclosure generally relates to composite constructs and, more particularly, to cartons with injection-molded features.

SUMMARY OF THE DISCLOSURE

In general, one aspect of the disclosure is generally directed to a container comprising a base panel, a plurality of side panels that extends upwardly from the base panel and extends at least partially around and at least partially defines a cavity of the container. A plurality of multi-part flanges respectively extend outwardly from upper edges of side panels of the plurality of side panels, and wherein at least one of the multi-part flanges includes a lower flange portion that extends outwardly from the upper edge of the respective side panel. An intermediate portion extends upwardly from an outer edge of the lower flange portion, and an upper flange portion extends outwardly from the intermediate portion. A band is injection-molded onto both an upper surface of the upper flange portion, and an upper surface of the lower flange portion. The band comprises an elongate portion that extends outwardly from an edge of the upper flange portion.

In another aspect, the disclosure is generally directed to a blank for forming a container having an injection-molded feature. The blank comprises a base panel, and a plurality of flaps respectively connected to and extending outwardly from the base panel. The plurality of flaps includes a first flap and a second flap that is adjacent to the first flap. A gap is defined between the first and second flaps. At least an inner portion of the gap becomes wider farther from the base panel. The first flap has a first corner tab and the second flap has a second corner tab. The first corner tab and the second corner tab project inward to narrow a width of the gap at a marginal portion of the blank. The first corner tab and the second corner tab are shaped to facilitate forming the injection-molded feature.

In another aspect, the disclosure is generally directed to a tool for forming a container. The tool comprises a cavity operable to receive a blank. The cavity has at least one sidewall for forming at least one sidewall of the container and at least one flange wall for forming at least one flange of the container. A core is operatively connected to the cavity. The core is operable to enter the cavity to at least partially form the blank into the container. The tool comprises an injection cavity at least partially formed from the cavity and the core. The injection cavity is for receiving liquid resin and directing liquid resin around at least a portion of the perimeter of the blank. The injection cavity comprising an advanced-flow section and a delayed-flow section. The advanced-flow section has a greater cross-sectional area than the delayed-flow section. The advanced-flow section is located adjacent the at least one sidewall of the cavity and the delayed-flow section extends outwardly from the advanced-flow section beyond the flange wall.

In another aspect, the disclosure is generally directed to a method for forming a container having an injection-molded feature. The method comprises obtaining a blank, placing the blank in a forming tool. The tool comprises an injection cavity having an advanced-flow section and a delayed-flow section. The method comprising then closing the tool while the blank is in the tool, so that the blank is formed into a three-dimensional article that is in the closed tool. The three-dimensional article having at least one sidewall and a flange that extends from the sidewall. The method comprising then forming the injection-molded feature on the article while the article is in the closed tool. The forming the injection-molded feature comprises injecting resin into the injection cavity so that resin flows in the advanced-flow section at a higher flow rate than resin in the delayed-flow section. The advanced-flow section being adjacent the at least one sidewall and the delayed-flow section extending outwardly from the advanced-flow section beyond the flange. The method comprising then removing the article with the injection-molded feature from the tool.

Those skilled in the art will appreciate the above-stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the disclosure.

BRIEF DESCRIPTION OF THE DRAWINGS

FIG. 13 is a top view of the cavity.

Corresponding parts are designated by corresponding reference numbers throughout the drawings.

DETAILED DESCRIPTION OF THE EXEMPLARY EMBODIMENT

Figure 1:
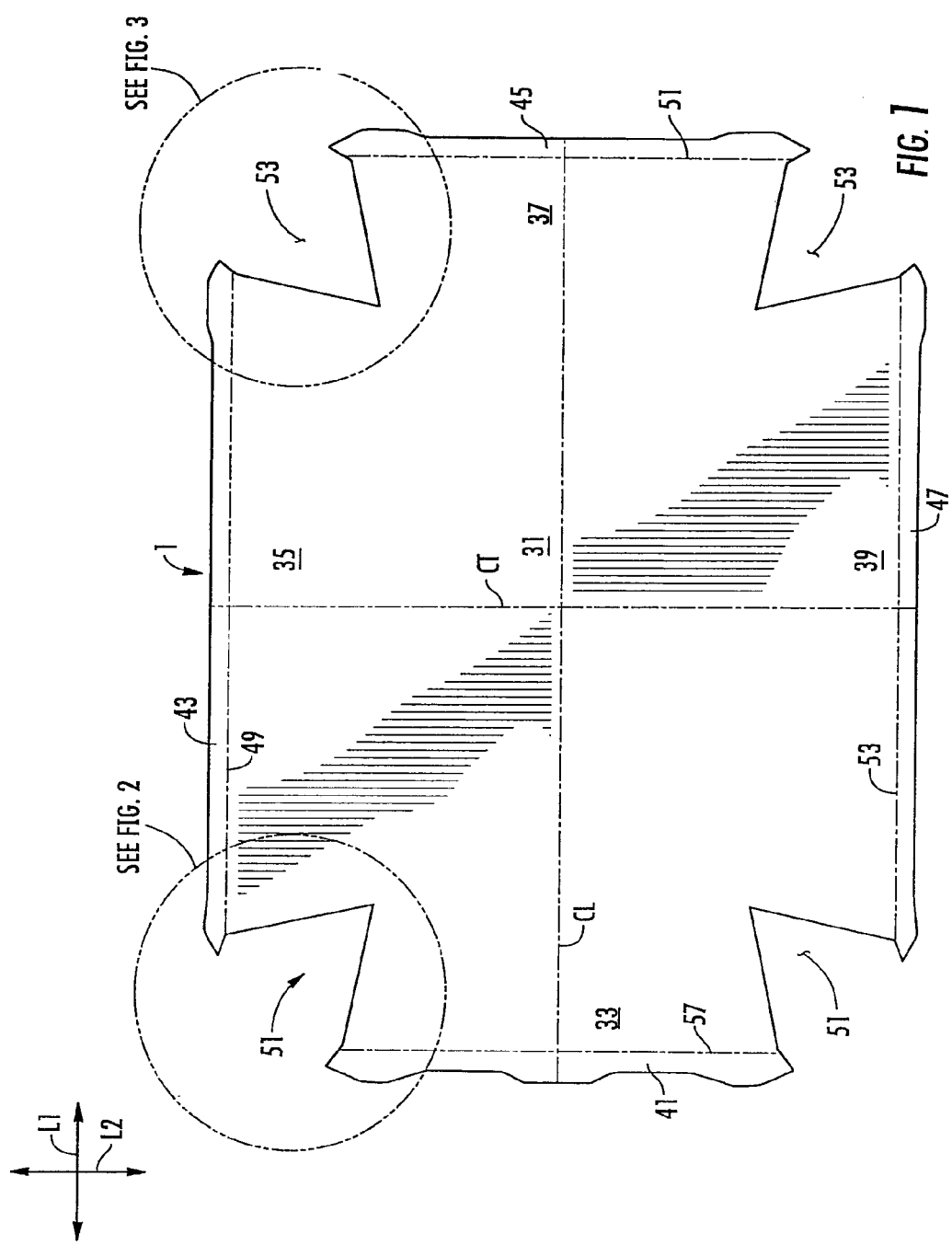
FIG. 1 is a plan view of a blank for forming a container of one embodiment of the disclosure.
Figure 4:
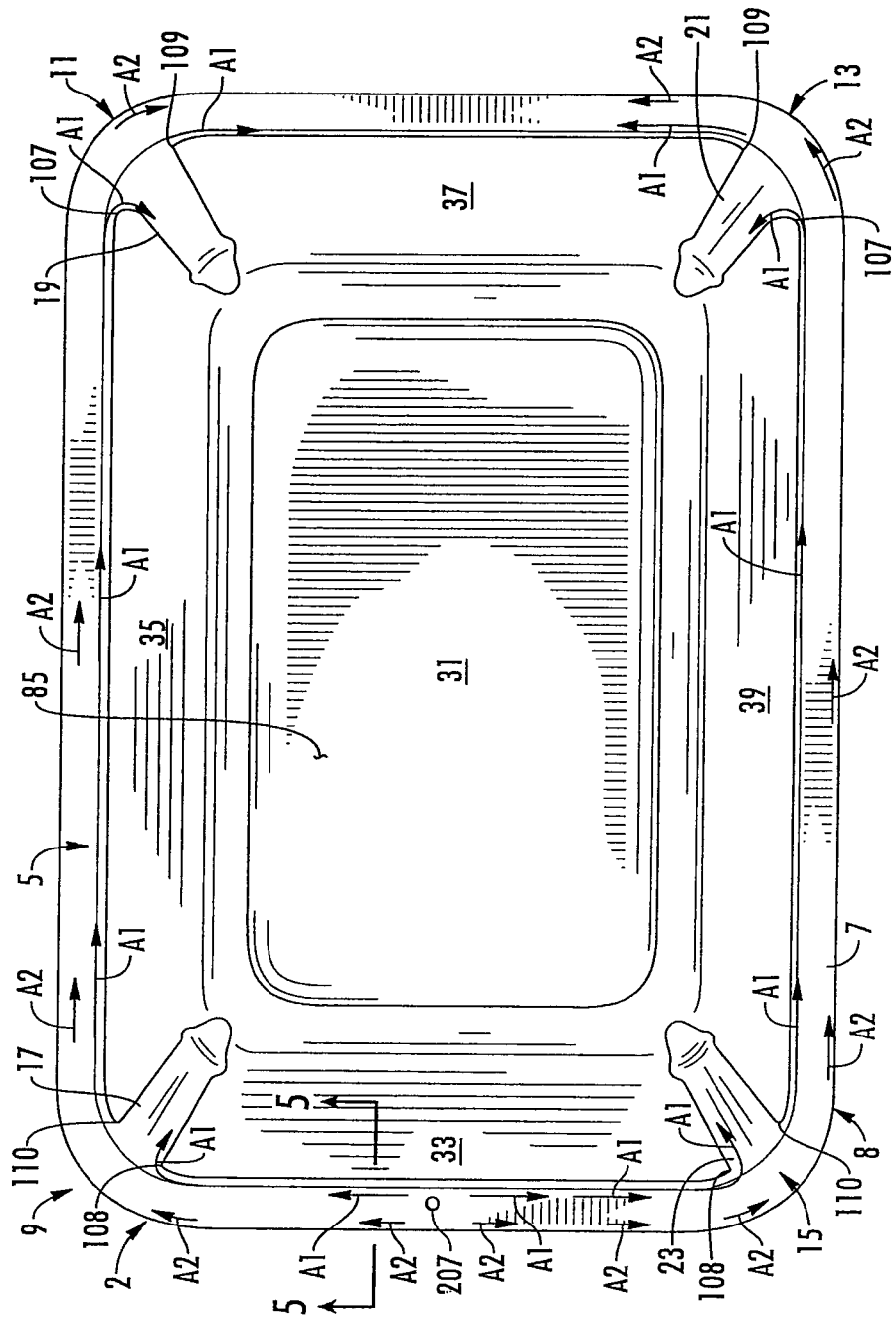
FIG. 4 is a top view of a container formed from the blank of FIG. 1.

FIG. 1 illustrates a blank 1 for forming a construct, namely a container 2 (FIG. 4). The container 2 comprises an injection-molded structure or frame 5 (FIG. 4) that comprises a band 7 extending around the perimeter of the container. The band 7 cooperates with portions of the blank 1 to form a flange 8 of the container 2 with the band forming a top surface of the container. In the illustrated embodiment, the container 2 is generally rectangular-shaped having four corners 9, 11, 13, 15 and the injection molded structure 5 comprises a respective strip 17, 19, 21, 23 at each corner of the container. The blank 1 can be formed into the container 2 by the forming tool 27 at least partially illustrated in FIGS. 10-14.

As shown in FIG. 1, the blank has a longitudinal axis L1 and a lateral axis L2. In the illustrated embodiment, the blank 1 has a longitudinal centerline CL and a lateral centerline CT. In one embodiment, the blank 1 is symmetrical about the lateral centerline CT but the blank could be otherwise shaped. The blank 1 comprises a base panel 31 and four side panels or flaps 33, 35, 37, 39. In the illustrated embodiment, the side panels 33, 35, 37, 39 are foldably connected to the base panel 31, but the blank 1 is free from preformed fold lines that foldably connect the side panels to the base panel 31. Alternatively, the blank 1 could include preformed fold lines without departing from the disclosure. Each of the side panels 33, 35, 37, 39 includes a flange portion 41, 43, 45, 47 at a respective marginal edge of the side panels for being formed into the flange 8 of the container 2. As shown in FIG. 1, each of the flange portions 41, 43, 45, 47 are defined by a line 49, 51, 53, 57 that extends across a respective side panel 33, 35, 37, 39. The lines 49, 51, 53, 57 can be preformed fold lines, the lines could be lines of demarcation or indicia that represent the top edges of the side panels 33, 35, 37, 39 of the container 2, or the lines could be formed by the forming tool 27 when the blank 1 is formed into the container.

Figure 2:
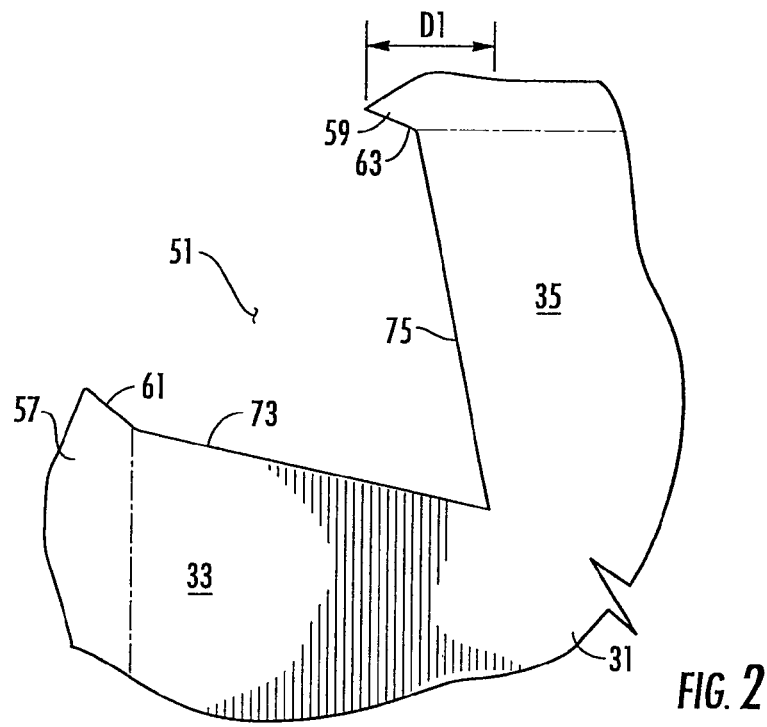
FIG. 2 is an enlarged portion of FIG. 1.
Figure 3:
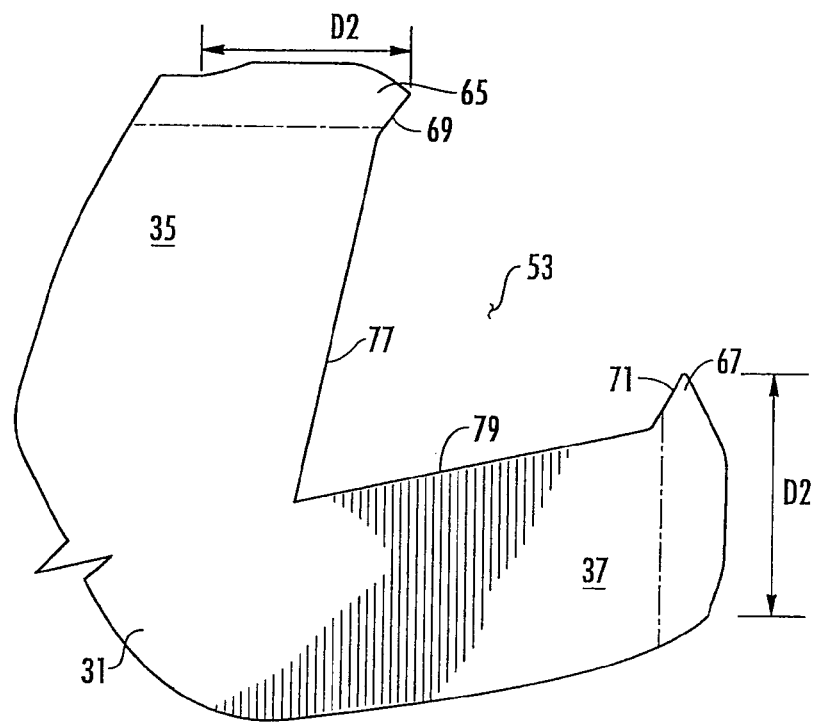
FIG. 3 is an enlarged portion of FIG. 1.

FIGS. 2 and 3 are enlarged views of respective portions of the blank 1, with FIG. 2 showing a first corner gap 51 between adjacent side panels 33, 35 and FIG. 3 showing a second corner gap 53 between adjacent side panels 35, 37. The side panels 33, 35 have respective corner tabs 57, 59 with edges 61, 63. In the illustrated embodiment, the corner tab 57 overlaps that corner tab 59 when the blank 1 is formed into the container. As shown in FIG. 3, the side panel 35 has a corner tab 65 at the opposite longitudinal end of the side panel from the corner tab 59, and the side panel 37 has a corner tab 67 at the corner gap 53. The corner tab 65 overlaps the corner tab 67 when the blank 1 is formed into the container 2. The corner tab 65 has an edge 69 and the corner tab 67 has an edge 71. The corner tabs 57, 59 of the first corner gap 51 each project inward to narrow the width of the first corner gap at the edge margin of the blank 1. The corner tabs 65, 67 of the second corner gap 53 each project inward to narrow the width of the second corner gap at the edge margin of the blank 1. The first corner gap 51 is further defined by edges 73, 75 of the flaps 33, 35 that extend inward from respective edges 61, 63 of the corner tabs 57 59. The second corner gap 53 is further defined by edges 77, 79 of flaps 35, 37 that extend inward from respective edges 69, 71 of the corner tabs 65, 67.

In one embodiment the corner tab 59 has a length D1 that is less than a length D2 of the corner tab 65 at an opposite longitudinal end of the side panel 35. Further, the corner tab 67 is shaped to have the same length D2 as the corner tab 65 defining the corner gap 53. In on embodiment, the length D2 is at least approximately 1.25 times the length D1, but the blank could be otherwise configured without departing from the disclosure.

Figure 5:
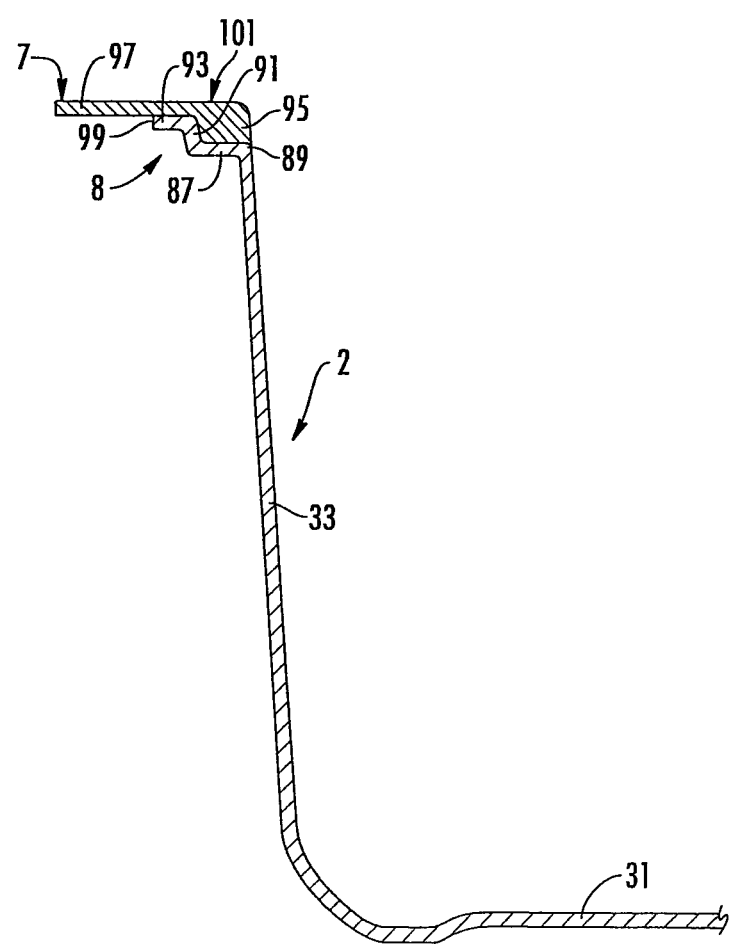
FIG. 5 is a cross-section taken along the plane 5-5 of FIG. 4.

As shown in FIG. 4. the container 2 is formed from the blank 1 such that the side panels 33, 35, 37, 39 extend upwardly from the base panel 31 to define a cavity 85 for receiving a food product (not shown). Each of the strips 17, 19, 21, 23 of the injection-molded structure 5 fill a respective corner gap 51, 53 between respective side panels 33, 35, 37, 39. As shown in FIG. 5 for one of the side panels 33, the flange 8 of the container 2 comprises a lower flange portion 87 extending upwardly from an upper edge 89 of the side panel, an intermediate portion 91 extending upwardly from the lower flange portion, and an upper flange portion 93 that extends outwardly from the intermediate portion. In the illustrated embodiment, the flange 8 in the other side panels 35, 37, 39 is shaped substantially the same as shown in the partial cross-section of FIG. 5, however, the flange could be otherwise shaped, arranged, and/or configured.

As shown in FIG. 5, the flange 8 comprises the band 7 of the injection-molded structure 5 that overlays the upper flange portion 93 and the lower flange portion 87. The band 7 comprises an inner portion 95 that overlays the lower flange portion 87 and is adjacent the upper edge 89 of the side panel and the intermediate portion 91. The band 7 comprises an outer portion 97 that extends from the inner portion 95 and overlays the upper flange portion 93. In the illustrated embodiment, the outer portion 97 is an elongate portion that extends beyond an outer radial edge 99 of the upper flange portion 93. In one embodiment, the inner portion 95 of the band 7 is of greater cross-sectional area than the elongated outer portion 97 of the band. The band 7 comprises a flat upper surface that is substantially continuous between the inner portion 95 and the outer portion 97 of the band.

Figure 6:
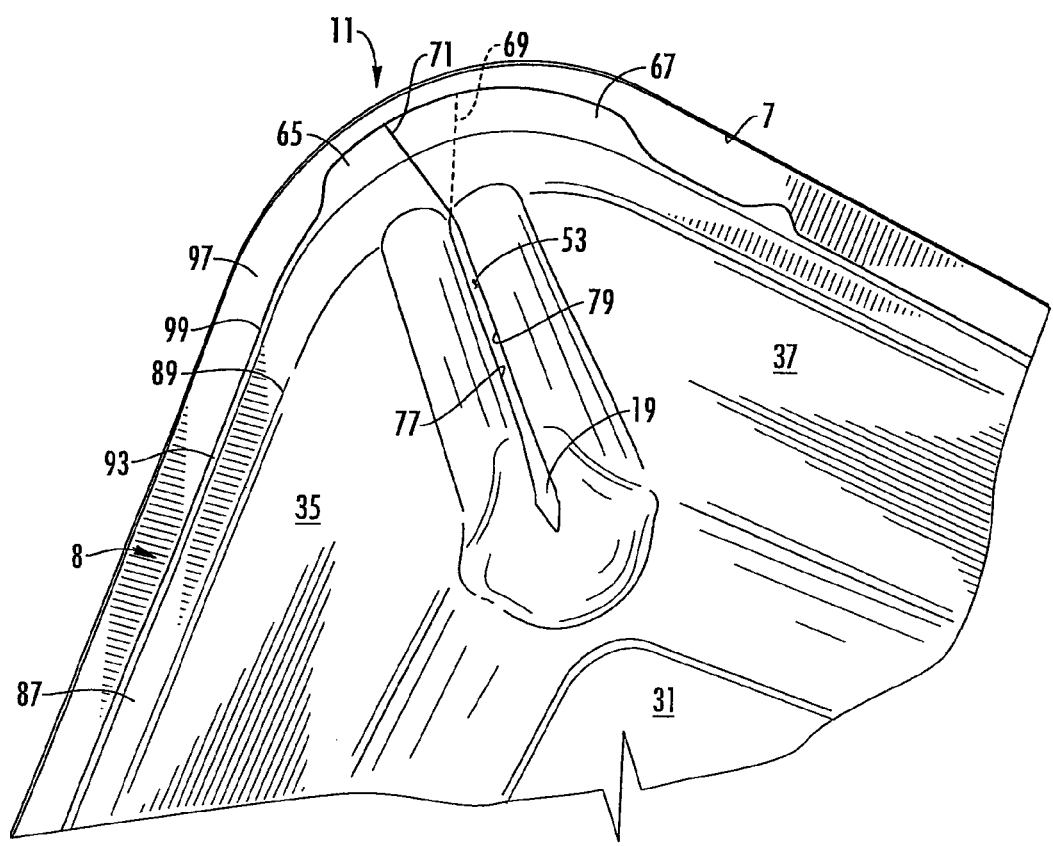
FIG. 6 is a bottom view of a corner of the container of FIG. 4.

As shown in FIG. 6, the overlapped corner tabs 65, 67 form a retention portion 103 at the corner 11 of the container 2. The retention portion 103 comprises the upper flange portion 93 of the flange 8 that extends outward at the corners 9, 11, 13, 15 of the container 2 so that the amount of the outer portion 97 of the band 7 that extends beyond the edge 99 of the upper flange portion is reduced in the corners of the container 2. The retention portion 103 facilitates formation of the band 7 at the corners 9, 11, 13, 15 of the container 2 and increases the rigidity of the container at the corners.

Figure 7:
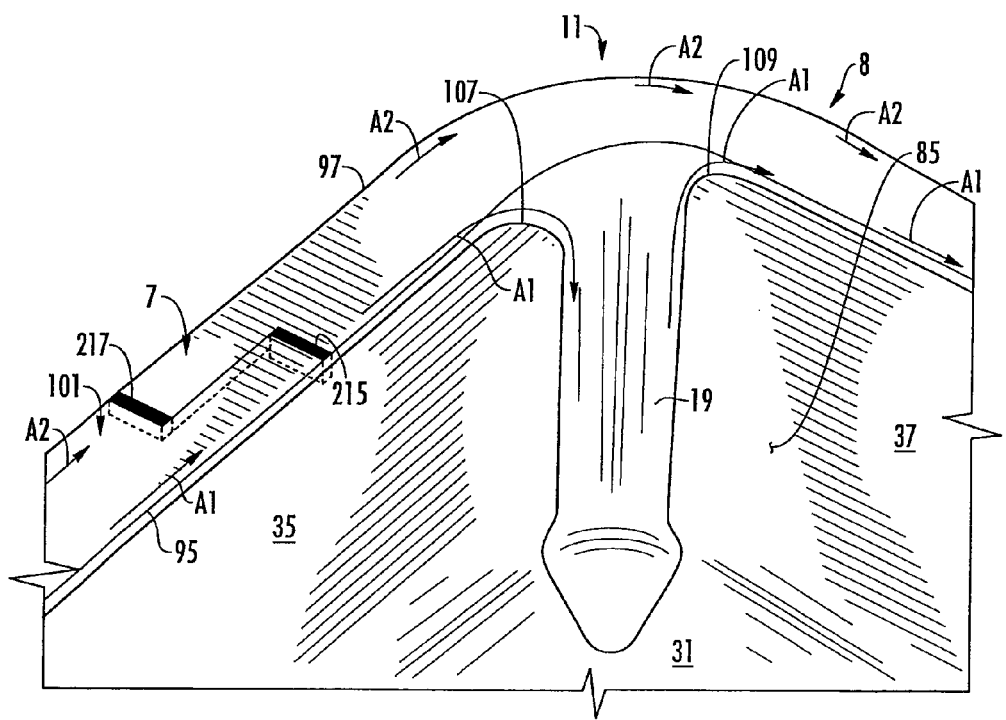
FIG. 7 is a perspective of the interior of a corner of the container of FIG. 4.

As shown in FIG. 7, the strip 19 that extends down from the band 7 at the corner 11 has a first upper corner 107 and a second upper corner 109. The first upper corner 107 has a larger radius of curvature than the second upper corner 109. Similarly, the strip 21 at the corner 13 is similarly shaped as the strip 19. As discussed below, the larger radius of curvature of the first upper corner 107 facilitates the flow of injection molded material that forms the strip 19. In the illustrated embodiment, the strips 17, 23 of the corners 9, 15 of the container 2 have first upper corners 108 and second upper corners 119 that are similarly shaped to the second upper corner 109 of the strips 19, 21.

Figure 8:
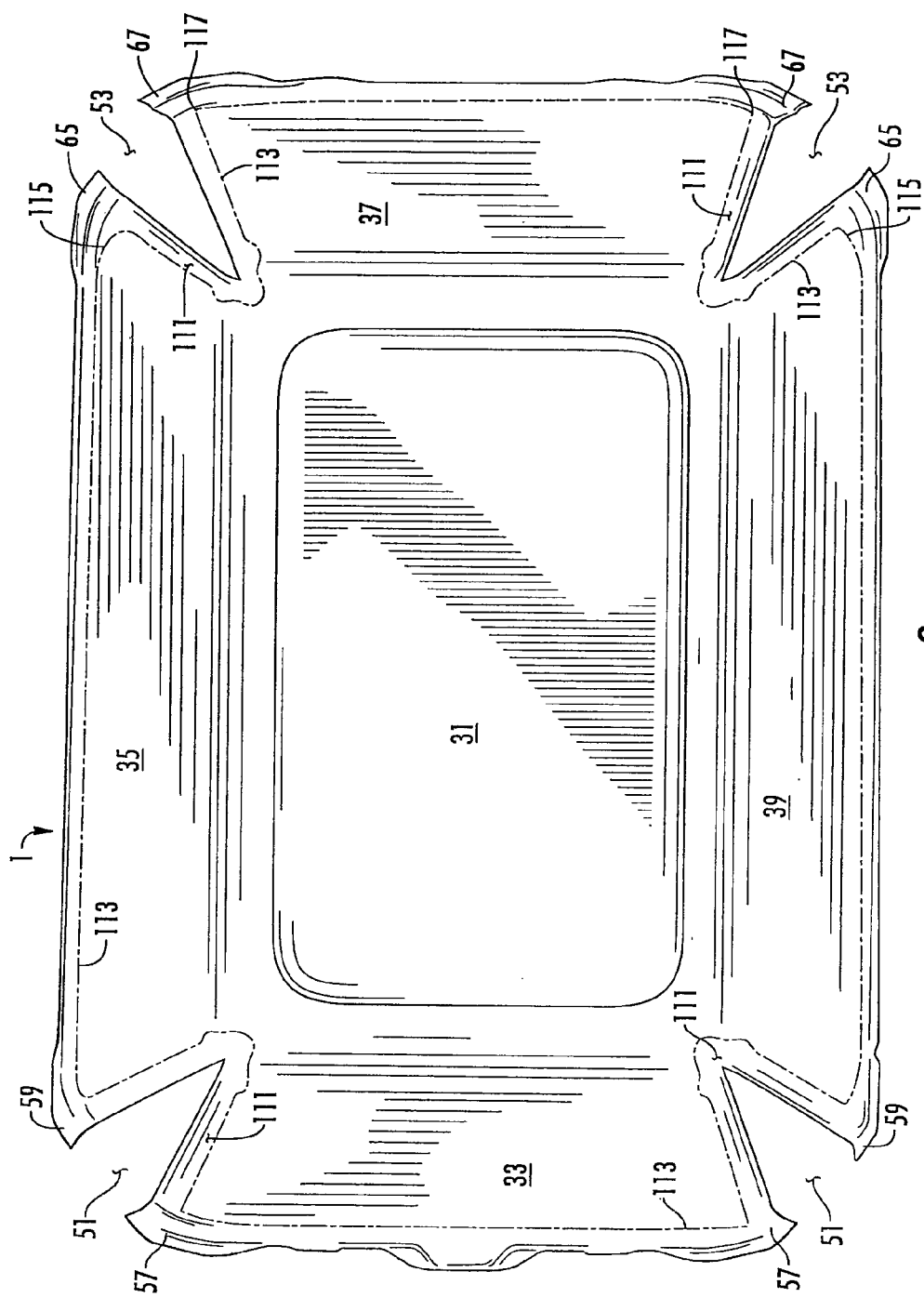
FIG. 8 is a top view of the blank of FIG. 1 partially formed into the container.
Figure 9:
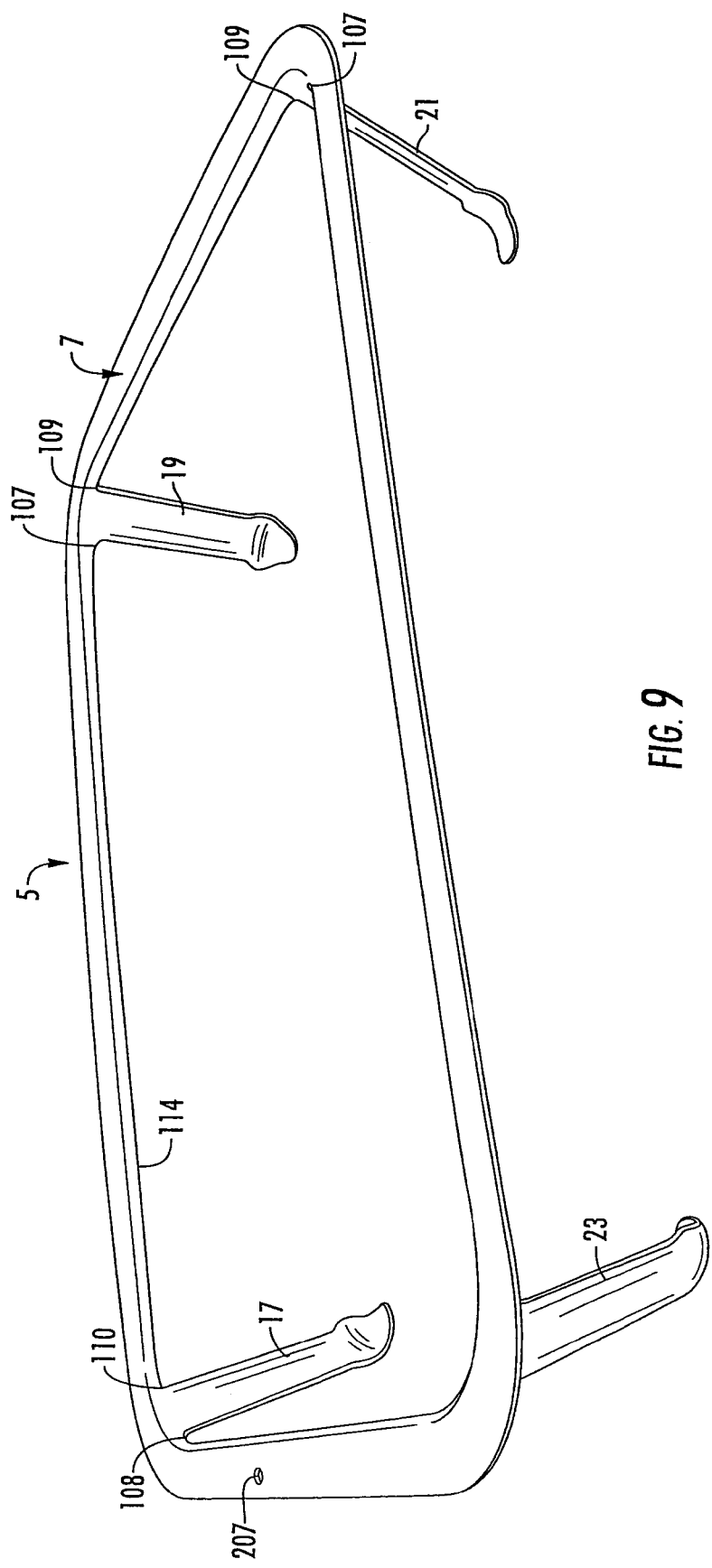
FIG. 9 is a perspective of an injection-molded frame removed from the container.

As shown in FIGS. 8 and 9 the injection-molded structure 5 (FIG. 9) has been separated from the blank 1 (FIG. 8). As shown in FIG. 8, the edge margin of the side panels 33, 35, 37, 39 have the shape of the flange 8 of the container. Each of the corner tabs 57, 59 and the corner tabs 65, 67 have been separated to expand the corner gaps 51, 53. A depression 111 is defined by a marginal fold line 113 that is spaced inward from the edge of the blank 1. The marginal fold line 113 corresponds to an innermost edge 114 of the injection-molded frame 5 in the container 2. At each of the corner gaps 53, the marginal fold line 113 has a first upper corner 115 and a second upper corner 117 respectively corresponding to the first upper corner 107 and the second upper corner 109 at each of the strips 19, 21 of the injection-molded structure at respective corner 11, 13 of the container 2. At each of the corner gaps 51, the marginal fold line 113 has a first upper corner 115 and a second upper corner respectively corresponding to the first upper corner 108 and the second upper corner 110 of the strips 17, 23. At each of the corner gaps 51, 53, the first upper corner 115 of the marginal fold line 113 has a larger radius of curvature than the second upper corner 117 of the marginal fold line. The marginal fold line 113, the blank 1, and/or the injection-molded structure 5 could be otherwise shaped, arranged, and/or configured.

Figure 10:
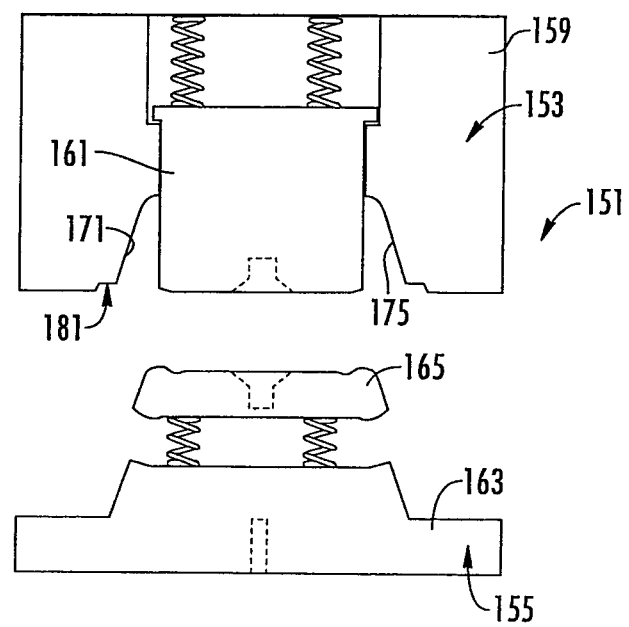
FIG. 10 is a schematic of a tool for forming the container.

FIG. 10 illustrates one embodiment of a forming tool 151 for forming the container 2. The forming tool 151 comprises a cavity 153 and a core 155 that are operable to form the blank 1 into the shape of the container 2. Further, the forming tool 151 includes an injection cavity 157 for injecting injection-molding material (e.g., resin) around the perimeter of the blank 1 to form the injection-molded structure 5 of the container 2. The container 2 could be otherwise formed from tools other than forming tool 151 without departing from this disclosure.

In the illustrated embodiment, the cavity 153 has a base portion 159 and an articulated portion 161 that is moveably connected to the base portion. The core 155 has a base portion 163 and an articulated portion 165 that is moveably connected to the base portion of the core. Springs 167, 169 are connected to respective articulate portions 161, 165. The core 155 is operable to enter the cavity 153 when the tool 151 is closed to press form a blank 1 into the shape of the cavity.

Figure 12:
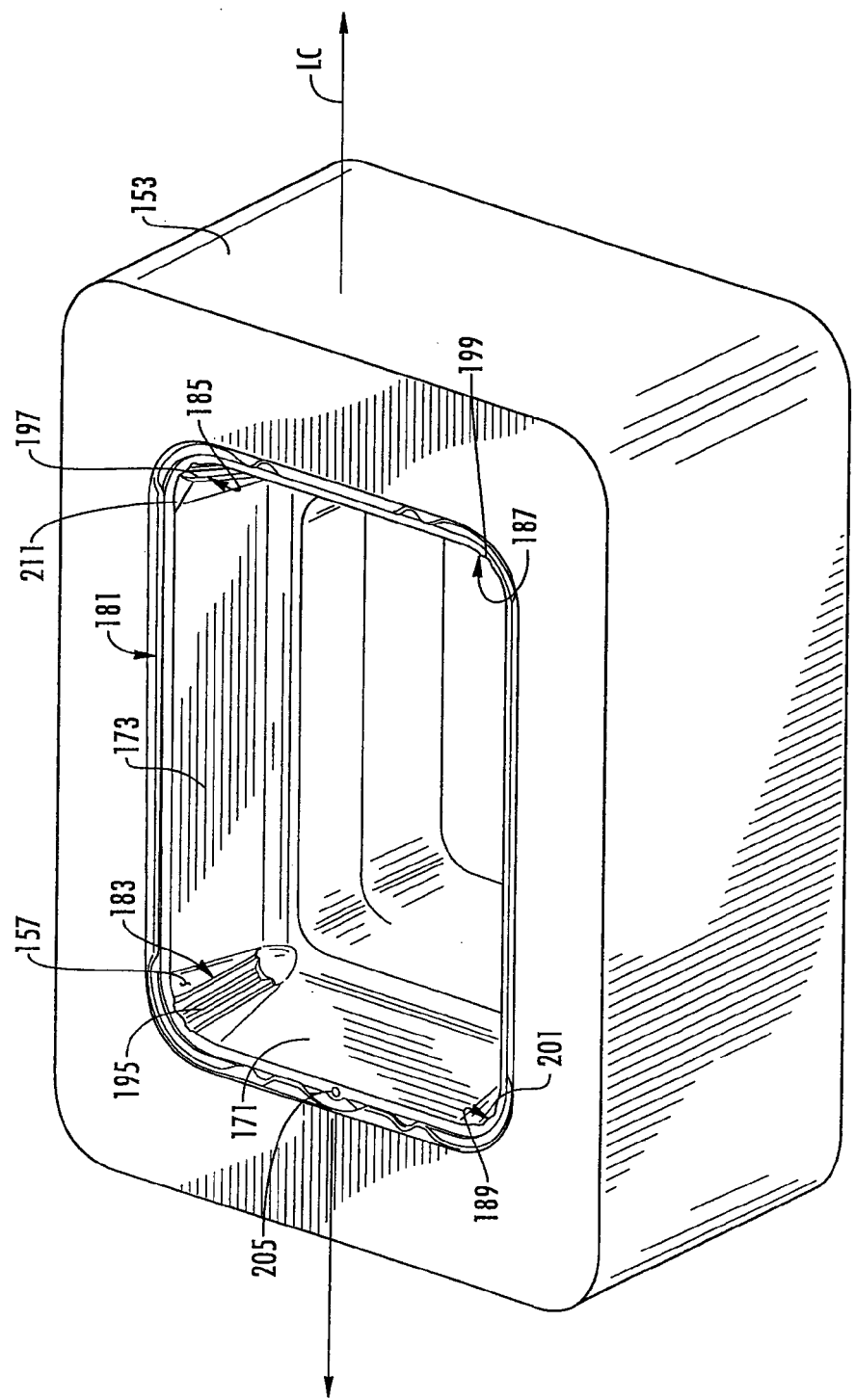
FIG. 12 is a perspective of a cavity of the forming tool.
Figure 13A:
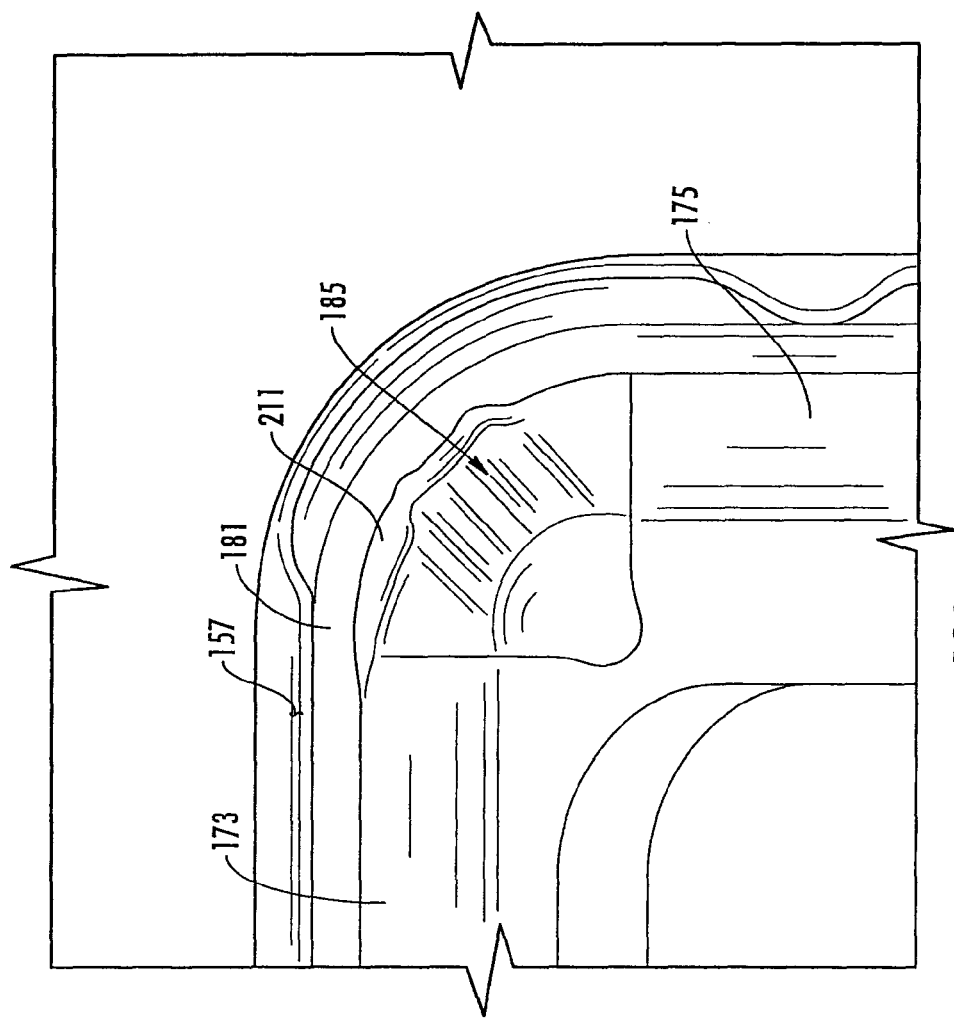
FIG. 13A is an enlarged portion of the cavity.
Figure 14:
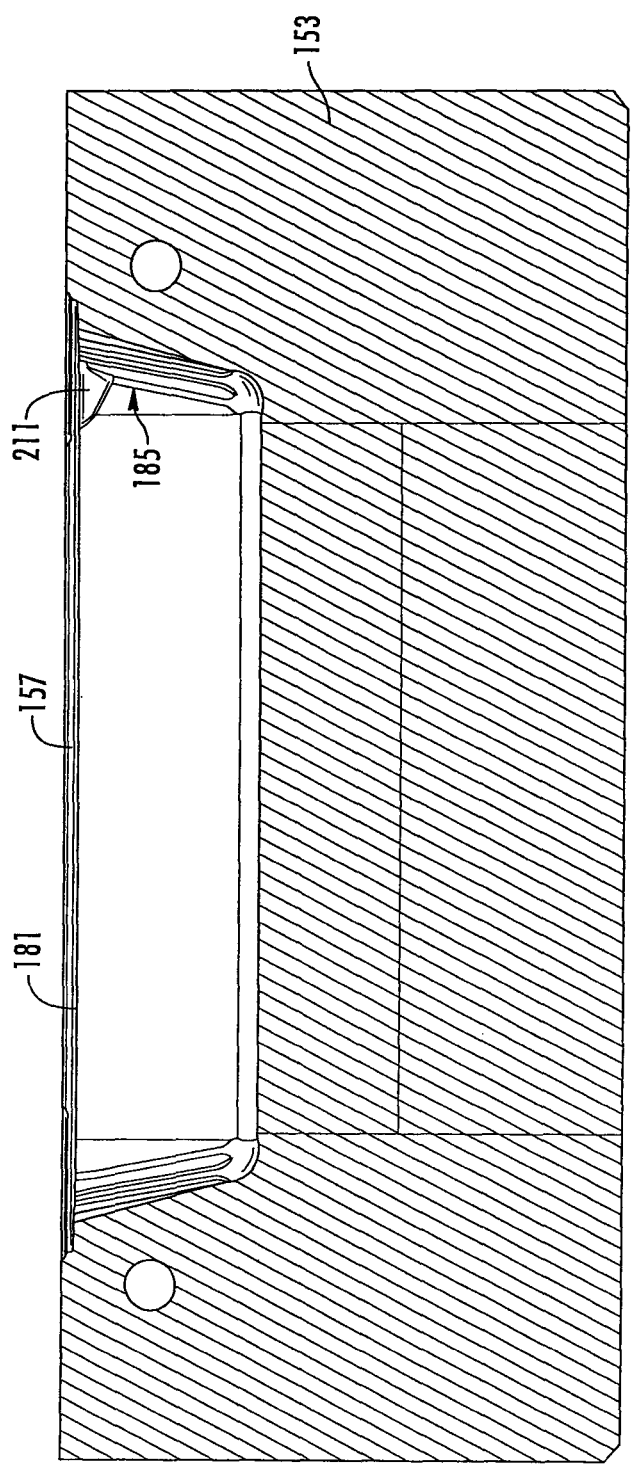
FIG. 14 is a cross-section of the cavity.

As shown in FIGS. 12-14, the cavity 153 includes four side walls 171, 173, 175, 177 corresponding to the shape of the side walls 33, 35, 37, 39 of the container 2. The cavity 153 includes a flange wall 181 extending generally perpendicular to the side walls 171, 173, 175, 177 and extending around the perimeter of the cavity 153. The flange wall 181 is shaped to form the flange 8 of the container 2 that includes the shape of the flange portions 41, 43, 45, 47 of the side panels 33, 35, 37, 39. The cavity 153 has corners 183, 185, 187, 189 that are shaped to from the corners 9, 11, 13, 15 of the container.

Figure 11A:
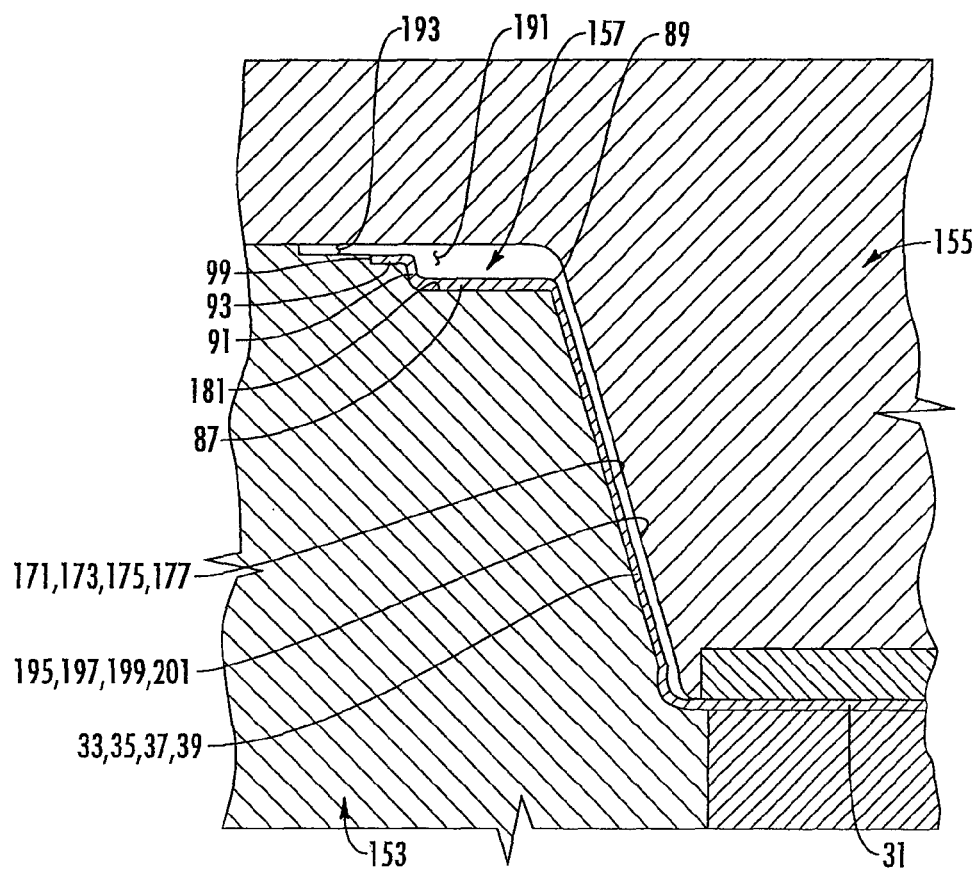
FIG. 11A is a schematic of the tool in a closed state with a portion of the blank being formed into the container.
Figure 11B:
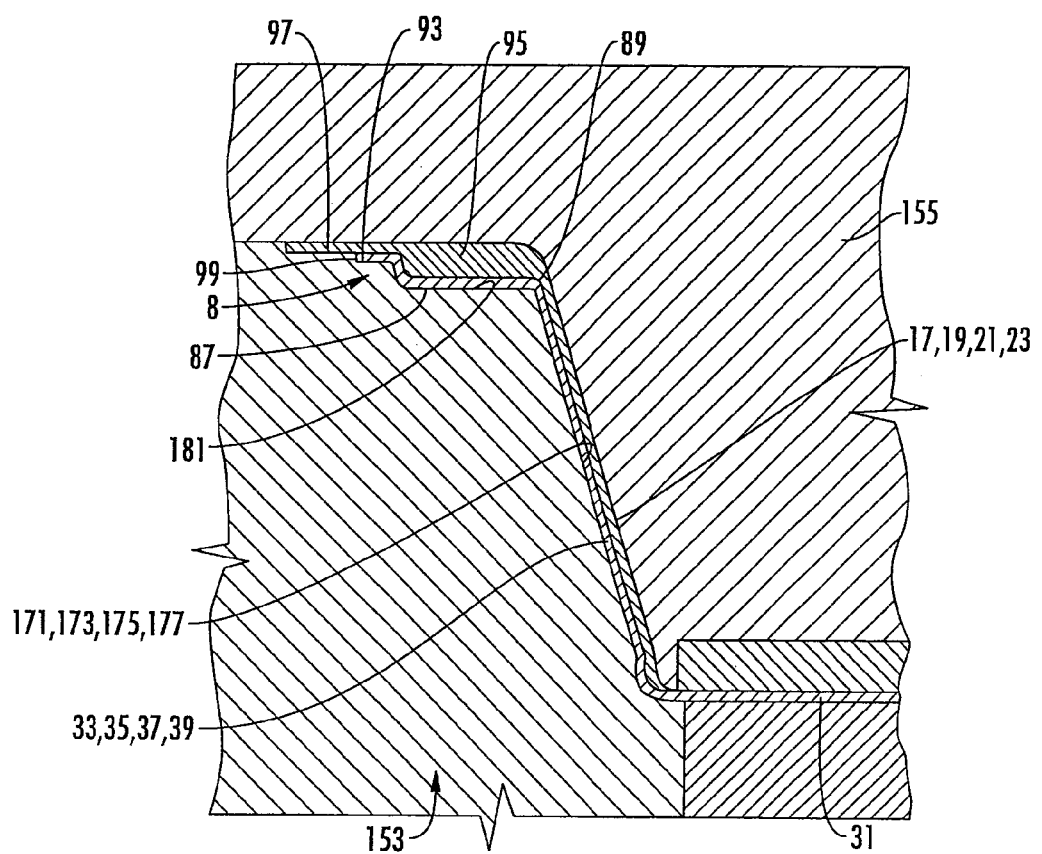
FIG. 11B is a view similar to FIG. 11A but with the container further formed.

When the core 155 and the cavity 153 are closed, the injection cavity 157 is formed. As shown in FIG. 11A, the injection cavity includes an advanced-flow section 191 adjacent the side walls 171, 173, 175, 177 for forming the inner portion 95 of the band 7 of the injection-molded structure 5. A delayed-flow section 193 is located laterally outward from the advanced flow section 191 and extends laterally outward from the flange wall 181. The delayed flow region 193 forms the outer portion 97 of the band 7 of the injection-molded structure 5. The advanced-flow section 191 has a greater cross-sectional area than the delayed-flow section 193 so the injection-molding material (e.g., resin) flows around the perimeter of the cavity 153 at a higher flow rate than the injection-molding material in the delayed-flow region. The higher flow rate of injection-molding material in the advanced-flow region 191 presses the lower flange 87 and the upper flange 93 tight against the flange wall 181 of the cavity 153 to prevent injection-molding material from flowing between the lower flange and/or the upper flange and the flange wall of the cavity.

In one embodiment, the advanced-flow section 191 of the injection cavity 157 includes corner regions 195, 197, 199, 201 in each of the corners 183, 185, 187 of the cavity 153. The corner regions 195, 197, 199, 201 are shaped to form the strips 17, 19, 21, 23 of the injection-molded structure 5. Injection-molded material is introduced to the injection cavity 157 at an injection port 205 or gate valve located below the flange wall at one end of the cavity 153 adjacent the side wall 171. In the illustrated embodiment, the injection port 205 is located on the longitudinal centerline LC of the cavity 153 but the injection port could be otherwise located. The injection port 205 forms an imperfection 207 on the injections molded structure 5.

As shown in FIGS. 4 and 7, when injection-molding material is introduced through the injection port 205 it flows in the direction of arrows A1, A2 around the perimeter of the container 2. The arrows A1 are longer than the arrows A2 to indicate the general location of the advanced-flow section 191 where injection-molding material flows at a higher flow rate than the injection-molding material in the delayed-flow section 193. The flow of injection-molding material in the advanced-flow region 191 forms a flow front 215 (illustrated schematically in FIG. 7) of injection-molding material that is in front of a flow front 217 (illustrated schematically in FIG. 7) of the injection-molding material in the delayed-flow region 193.

As shown in FIGS. 12 and 13, the corners 185, 187 of the cavity 153 that are farthest away from the injection portion 205 include cutouts 211 that form the first upper corners 107 of the strips 19, 21. The cutouts 211 facilitate flow of the injection-molding material in the advanced-flow sections 191 at the corners 185, 187. As shown in FIG. 7, the cutouts 211 allow flow in the direction of arrow A1 in the advanced-flow section 193 to form the strips 19, 21 at each corner 11, 13 of the container. The cutouts 211 allow the flow front 215 of the injection-molding material in the advanced-flow section 191 to stay in front of the flow front 217 of the injection-molding material in the delayed-flow section 193 of the injection cavity 157.

The container 2 and injection-molded structure 5 may have similar characteristics as the container and injection-molded structure described in co-assigned U.S. patent application Ser. No. 11/715,718 filed Mar. 8, 2007 ("the '718 application"), the entire contents of which is incorporated by reference herein for all purposes. Further, the container 2 and injection-molded structure 5 may be formed by similar methods, tools, apparatus, etc. as disclosed in the '718 application. The container 2 and the injection-molded structure 5 can be formed from similar materials as disclosed in the '718 application. The injection-molded structure 5 is typically constructed of polymeric material; however, the structure can also be constructed of other types of materials.

The container 2 and blank 1 can be formed from a laminate that includes more than one layer, but alternatively the laminate can be replaced with a single ply of material, such as, but not limited to, paperboard, cardboard, paper or a polymeric sheet. In accordance with the exemplary embodiments of the present disclosure, the laminate can includes a polymer film that is supported by, and secured to, a substrate that can be in the form of cardboard, paperboard or any other suitable material. Alternatively, the paperboard and polymer film can be replaced with any other suitable materials, for example such that the substrate of the present disclosure is not limited to paperboard or the like. Nonetheless and in accordance with the exemplary embodiments, the substrate typically is a clay-coated paperboard. As should be apparent, the paperboard can be more generally characterized as a substrate, and a suitable substrate can include paperboard with or without typical supplemental materials, such as coatings that can include clay coatings, colorants, indicia and the like. Further, the container 2 can include other materials, laminates, substrates, etc., such as the materials disclosed in the '718 application, the entire contents of which is incorporated by reference herein for all purposes. The container 2 can include microwave energy interactive material such as the microwave interactive material described in the '718 application. The container 2 may include other microwave energy interactive materials or other materials without departing from the disclosure.

In accordance with the exemplary embodiments of the present disclosure, the blanks can be formed from paperboard, corrugated cardboard or other materials having properties suitable for at least generally enabling respective functionalities described above. Paperboard is typically of a caliper such that it is heavier and more rigid than ordinary paper, and corrugated cardboard is typically of a caliper such that it is heavier and more rigid than paperboard. Typically, at least the side of the paperboard or cardboard that will be an exterior surface in the carton erected therefrom will be coated with a clay coating, or the like. The clay coating can be printed over with product, advertising, price-coding, and other information or images. The blanks may then be coated with a varnish to protect any information printed on the blanks. The blanks may also be coated with, for example, a moisture barrier layer, on one or both sides. The blanks can also be laminated to or coated with one or more sheet-like materials.

The foregoing description of the disclosure illustrates and describes various embodiments of the present disclosure. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, and alterations, etc., of the above-described embodiments. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure without departing from the scope of the disclosure.

What is claimed is:

1. A method for forming a container having an injection-molded feature, the method comprising:
    obtaining a blank;
    placing the blank in a forming tool, the tool comprising an injection cavity having an advanced-flow section and a delayed-flow section, the advanced-flow section having a greater cross-sectional area that the delayed-flow section, the injection cavity extending around the perimeter of the blank with the advanced-flow section and the delayed-flow section extending around the perimeter of the blank;
    then closing the tool while the blank is in the tool, so that the blank is formed into a three-dimensional article that is in the closed tool, the three dimensional article having at least one sidewall, a flange that extends from the sidewall, and a corner;
    then forming the injection-molded feature on the article while the article is in the closed tool, the forming comprises injecting resin into the injection cavity so that resin flows in the advanced-flow section at a higher flow rate than resin in the delayed-flow section, the advanced-flow section being adjacent the at least one sidewall and the delayed-flow section extending outwardly from the advanced-flow section beyond the flange, the forming comprises forming an injection-molded strip by the flow of resin in the advanced-flow section of the injection cavity that at least partially defines the corner of the three-dimensional article, the injection cavity having a cutout for facilitating flow of resin in the advanced-flow section at the corner wherein the injection-molded strip is formed by the flow of resin in the cutout; and
    then removing the article with the injection-molded feature from the tool.

2. The method of claim 1 wherein the advanced-flow section is configured to permit a higher flow rate of resin flow than the delayed-flow section.

3. The method of claim 1 wherein forming the injection-molded feature comprises forming an injection-molded band on an upper surface of the flange, the delayed-flow section comprising an elongate portion that extends outwardly from an edge of the flange.

4. The method of claim 3 wherein the injection-molded strip extends from the injection-molded band and at least partially defines the corner of the three-dimensional article.

5. The method of claim 4 wherein the tool comprises an injection port for the flow of resin into the injection cavity, the corner is a first corner and the article further comprises a second corner, a third corner, and a fourth corner, the cutout is a first cutout, and the injection-molded strip is a first injection-molded strip, the cavity comprises a second cutout for facilitating flow of resin in the advanced-flow section at the second corner of the three dimensional article to form a second injection-molded strip of the injection-molded feature.

6. The method of claim 5 wherein the first corner and the second corner are both located farther away from the injection port than the third corner and the fourth corner.

7. The method of claim 4, wherein the injection-molded strip extends downwardly from an inner portion of the band, and wherein the flow of resin in the cutout forms a first upper inner corner of the injection-molded strip having a first radius of curvature, the injection-molded strip has a second upper inner corner having a second radius of curvature, the first radius of curvature being greater than the second radius of curvature.

\* \* \* \* \*